US012689762B2

(12) United States Patent
Racape et al.

(10) Patent No.: US 12,689,762 B2
(45) Date of Patent: Jul. 21, 2026

(54) TEMPORAL STRUCTURE-BASED CONDITIONAL CONVOLUTIONAL NEURAL NETWORKS FOR VIDEO COMPRESSION

(71) Applicant: INTERDIGITAL VC HOLDINGS, INC.

(72) Inventors: Fabien Racape, San Francisco, CA (US); Jean Begaint, Menlo Park, CA (US); Simon Feltman, Sunnyvale, CA (US); Akshay Pushparaja, San Jose, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 357 days.

(21) Appl. No.: 18/281,844

(22) PCT Filed: Mar. 16, 2022

(86) PCT No.: PCT/US2022/020504
§ 371 (c)(1),
(2) Date: Sep. 13, 2023

(87) PCT Pub. No.: WO2022/197772
PCT Pub. Date: Sep. 22, 2022

(65) Prior Publication Data
US 2024/0187640 A1    Jun. 6, 2024

Related U.S. Application Data

(60) Provisional application No. 63/162,791, filed on Mar. 18, 2021.

(51) Int. Cl.
*H04N 19/537*        (2014.01)
*H04N 19/177*        (2014.01)
(Continued)

(52) U.S. Cl.
CPC ......... *H04N 19/537* (2014.11); *H04N 19/177* (2014.11); *H04N 19/184* (2014.11); *H04N 19/90* (2014.11)

(58) Field of Classification Search
CPC ..................................................... H04N 19/537
(Continued)

(56) References Cited

U.S. PATENT DOCUMENTS

| | | | |
|---|---|---|---|
| 2016/0366415 A1* | 12/2016 | Liu ...................... | H04N 19/463 |
| 2019/0327484 A1* | 10/2019 | Grange ................. | H04N 19/52 |
| 2022/0129740 A1* | 4/2022 | Yang ........................ | G06N 3/09 |

FOREIGN PATENT DOCUMENTS

WO        2020016857        1/2020

OTHER PUBLICATIONS

Agustsson, et al., Scale-Space Flow for End-to-End Optimized Video Compression, 2020 IEEE/CVF Conference on Computer Vision and Pattern Recognition (CVPR), Jun. 13-19, 2020, pp. 8503-8512.

(Continued)

*Primary Examiner* — Yulin Sun
(74) *Attorney, Agent, or Firm* — Condo Roccia Koptiw LLP

(57) ABSTRACT

Video encoding and decoding is implemented with auto encoders using luminance information to derive motion information for chrominance prediction. In one embodiment conditional convolutions are used to encode motion flow information. A current condition, for example, GOP structure, is used as input to a succession of fully connected layers to implement the conditional convolution. In a related embodiment, more than one reference frame is used to encode motion flow information.

20 Claims, 10 Drawing Sheets

(51) Int. Cl.
H04N 19/184 (2014.01)
H04N 19/90 (2014.01)
(58) Field of Classification Search
USPC .................................................... 375/240.16
See application file for complete search history.

(56) References Cited

OTHER PUBLICATIONS

Park et al., Deep Predictive Video Compression Using Mode-Selective Uni- and Bi-Directional Predictions Based on Multi-Frame Hypothesis, IEEE Access, vol. 9, Dec. 21, 2020, pp. 72-85.
Yang et al., Learning for Video Compression with Hierarchical Quality and Recurrent Enhancement, 2020 IEEE/CVF Conference on Computer Vision and Pattern Recognition (CVPR), Jun. 13-19, 2020, pp. 1-14.
Li et al., AHG11: Updated Information on Inter-Prediction Coding Tool With Deep Neural Network, 21. JVET Meeting, Jan. 6, 2021-Jan. 15, 2021, Teleconference, (The Joint Video Exploration Team of ISO/IEC JTC1/SC29/WG11 and ITU-T SG. 16), No. JVET-U0087-v2, 05 Jan. 5, 2021.

* cited by examiner

600

Start — 601

Entropy Decode Bitstream — 610

Perform Conditional Convolution
to Generate Residue — 620

Combine Reconstructed Residue with
Prediction to Generate Decoded Block — 630

700

TEMPORAL STRUCTURE-BASED CONDITIONAL CONVOLUTIONAL NEURAL NETWORKS FOR VIDEO COMPRESSION

CROSS REFERENCE TO RELATED APPLICATIONS

This application is a U.S. National Stage Application under 35 U.S.C. 371 of International Patent Application No. PCT/US2022/020504, filed Mar. 16, 2022, which is incorporated herein by reference in its entirety This application claims the benefit of U.S. Application No. 63/162,791, filed Mar. 18, 2021 which is incorporated herein by reference in its entirety.

TECHNICAL FIELD

At least one of the present embodiments generally relates to a method or an apparatus for compression of images and videos using Artificial Neural Network (ANN) based tools.

BACKGROUND

The Joint Video Exploration Team (JVET) between ISO/MPEG and ITU is currently studying tools to replace some modules of the latest standard H.266NVC, as well as the replacement of the whole structure by end-to-end auto-encoder methods.

SUMMARY

At least one of the present embodiments generally relates to a method or an apparatus in the context of the compression of images and videos using novel Artificial Neural Network (ANN)-based tools.

According to a first aspect, there is provided a method. The method comprises steps for: receiving an input to a conditional convolution layer, said input comprising a concatenated tensor of a current and at least one reference block; performing at least one conditional convolution on said input based on data representative of a current condition, said conditional convolution comprising a series of fully connected layers; encoding motion flow using an output from the at least one conditional convolution, wherein the current condition is based on GOP structure; and, generating a bitstream comprising said encoded motion flow.

According to a second aspect, there is provided a method. The method comprises steps for: entropy decoding a bitstream comprising motion flow data of a current block of video data; performing at least one conditional deconvolution on said bitstream to generate a reconstructed residue, said conditional deconvolution comprising a series of fully connected layers; and, combining said reconstructed residue with a prediction of said current block to generate a decoded block.

According to another aspect, there is provided an apparatus. The apparatus comprises a processor. The processor can be configured to implement the general aspects by executing any of the described methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

In recent years, novel image and video compression methods based on neural networks have been developed. Contrary to traditional methods which apply handcrafted prediction modes and transforms, ANN-based methods rely on parameters that are learned on a large dataset during training, by iteratively minimizing a loss function. In a compression case, the loss function describes both the estimation of the bitrate of the encoded bitstream, and an objective function of the decoded content. Traditionally the quality of the reconstructed image is optimized, for example based on the measure of the signal distortion or an approximation of the human-perceived visual quality.

Figure 1:
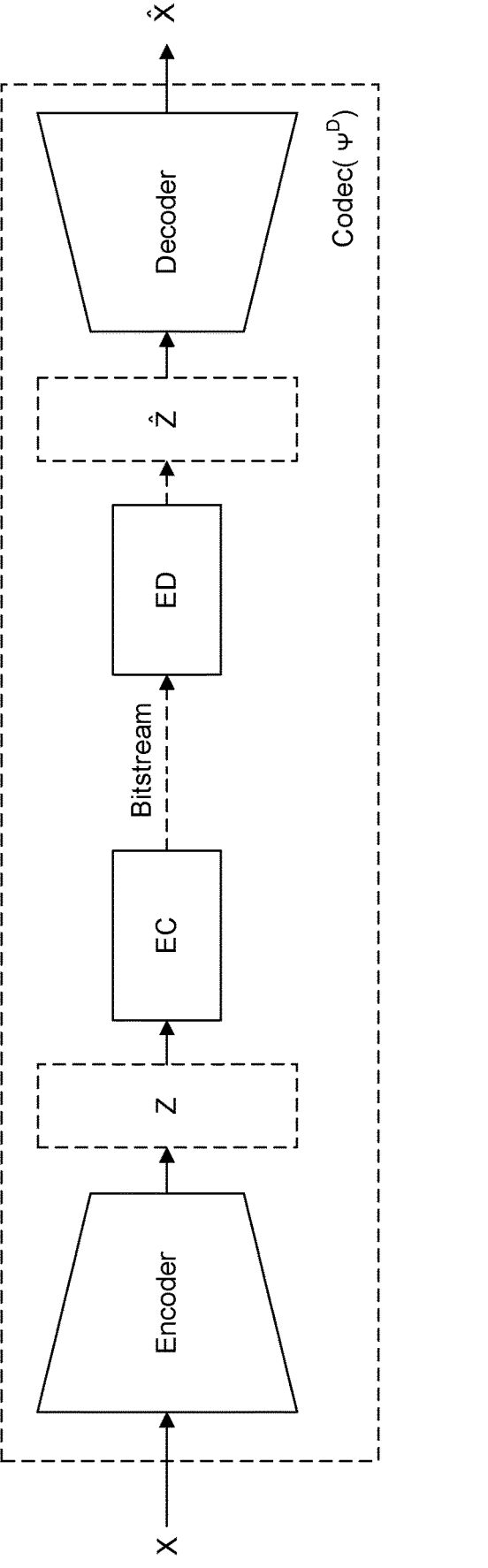
FIG. 1 illustrates a basic auto-encoder chain.

In FIG. 1, we show an exemplary end-to-end compression system. The input X to the encoder part of the network can consists of an image or frame of a video,
a part of an image a tensor representing a group of images/frames a tensor representing a part (crop) of a group of images/frames.

In each case, the input can have one or multiple color components, e.g.: monochrome, RGB or YCbCr (YUV) components.

1. The input tensor X is fed into the encoder network. The encoder network is usually a sequence of convolutional layers with non-linear activation functions. Large strides in the convolutions or space-to-depth[1] operations can be used to reduce the spatial resolution while increasing the number of channels. The encoder network can be seen as a learned analysis transform.

[1] Reshaping and permutation, for example a tensor of size (N, H, W) is reshaped and permuted to (N*2*2, H//2, W//2)

2. The output of the encoder network, the "features map" or "latent" Z, is quantized and entropy coded (EC) as a binary stream (bitstream) for storage or transmission.

3. The bitstream is entropy decoded (ED) to obtain $\hat{Z}$, the quantized version of Z.

4. The decoder network generates $\hat{X}$, an approximation of the original X tensor from the latent $\hat{Z}$. The decoder network is usually a sequence of upsampling convolutions (e.g.: "deconvolutions" or convolutions followed by upsampling filters) or depth-to-space operations. The decoder network can be seen as a learned inverse transform, or a denoising and generative transform.

Note that more sophisticated architectures exist, for example adding a "hyper-autoencoder" (hyper-prior) to the network in order to jointly learn the parameters of the latent distribution for efficient compression. This invention is not limited to the use of autoencoders. Any end-to-end differentiable codec can be considered.

Video Coding

Traditional Video Compression

To remove the redundancies between frames of video sequences, traditional video coding methods include inter prediction tools. The images are partitioned into blocks.

For each block to be encoded, a motion estimator tries to find a predictor in a previously reconstructed reference picture. A pure translation is traditionally considered, the motion estimator parses blocks of the same shape within a window co-located with the current block to predict. When the best match is found, the motion vector, i.e., the horizontal and vertical coordinate differences between the current block's location and its predictor, is coded and transmitted in the bitstream with the index of the reference picture. The difference between the source block and the predictor, also called residual, is generally transformed, quantized and entropy coded in the bitstream.

At the decoder, the motion information as well as the residuals are decoded. The predictor is accessed in the signaled reference frame, using the decoded motion vector. The decoded block is then constructed by adding the decoded residual to the predictor.

In this scheme, the encoder performs the complex task of finding a best-matching block within a window in the reference frame, centered at the current block's location. The decoder just needs to parse the motion information.

Temporal Structure

The preceding section described the search and transmission of motion vectors between a current frame to predict and a reference picture. Several temporal structures enable the encoder to select a reference frame among previously decoded pictures.

A typical structure that is used in the broadcast ecosystem is named Random Access Structure. It is composed of periodic Groups of Pictures (GOPs) which consist of the minimal temporal timeframe structure, that is repeated.

Figure 2:
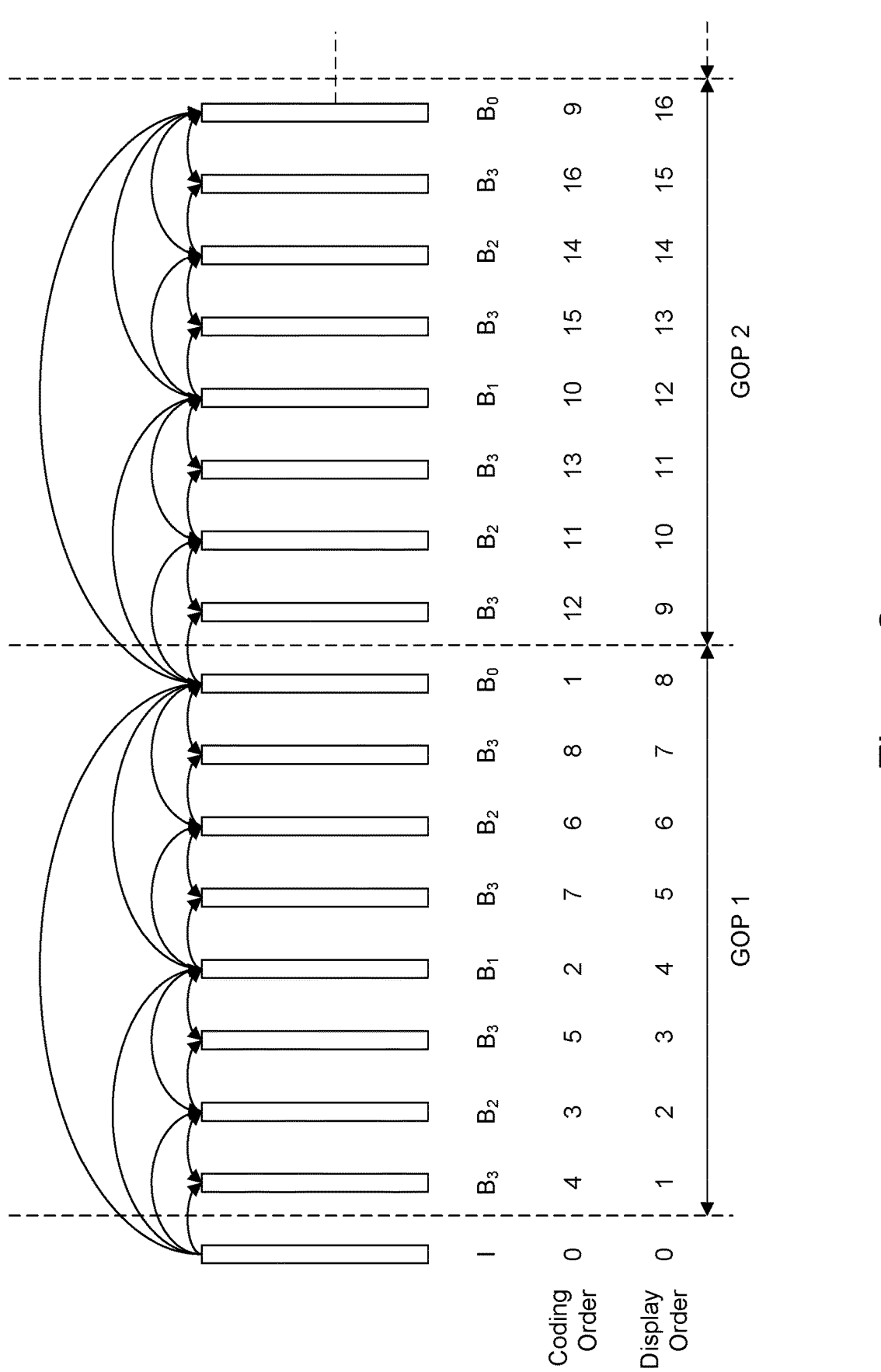
FIG. 2 illustrates a random access structure with Group of Pictures (GOPs) of eight frames.

FIG. 2 illustrates such a structure in the case of a GOP of 8 frames. The first frame is an Intra frame, or I-frame, meaning that it does not depend on other frames to be decoded. It can then be used as a random-access point, where a decoder can start decoding a sequence. In broadcast, they are typically separated by a second of video, which enables TV viewers to switch channels and start decoding the new channel they selected, and not wait for too long for the video to start being displayed. However, these frames usually cost a lot of bits to transmit since they are not predicted using previously decoded content. In between I-frames, the other frames are predicted using previously decoded frames. In the structure of FIG. 2, one can notice that the coding order is different from the order of display. This enables the encoder to predict the frames using past and future previously reconstructed pictures. These frames are hence called B frames for bi-directional prediction. Then, the structure follows a hierarchical pattern with frames of type $B_0$, $B_1$, $B_2$, and $B_3$. The $B_0$ of each GOP is the first frame to be coded, it is predicted using the last key frame (I or $B_0$) from previous GOPs, e.g., frame 8 in display order is predicted from frame 0. The following frames in coding order can be predicted using past and future frames, as depicted by the arrows. Frames $B_1$ can use frames of type I, $B_0$, frames $B_2$ can be predicted from frames I, $B_0$ and $B_1$ etc. The distance between the current frame and the reference frame then varies depending on the decisions made by the encoder.

Other GOP structures exist, this example was chosen to show the possible dependencies between frames at different distances between reference and predicted, which dramatically improve the coding efficiency. In the above example, when the motions in the scene are not too fast and erratic and there are no scene cuts, $B_3$ pictures cost very few bits as they are mostly interpolated from neighboring frames.

Video Compression Using Artificial Neural Networks

This section details state-of-the-art video compression methods based on artificial neural networks which serves as base model for the description of the invention. They rely on autoencoder architectures to encode the different elements and tackle the removal of inter-frame redundancies by computing an optical flow, which estimates a dense motion flow between frames, i.e., each pixel location is assigned a distinct 2d motion vector (horizontal and vertical).

Coupled with traditional block based inter prediction and residual coding, optical flow has so far failed to show benefits over the previously described block-based methods at a reasonable complexity. However, recent works using autoencoders to encode the motion fields have shown promising results.

Figure 3:
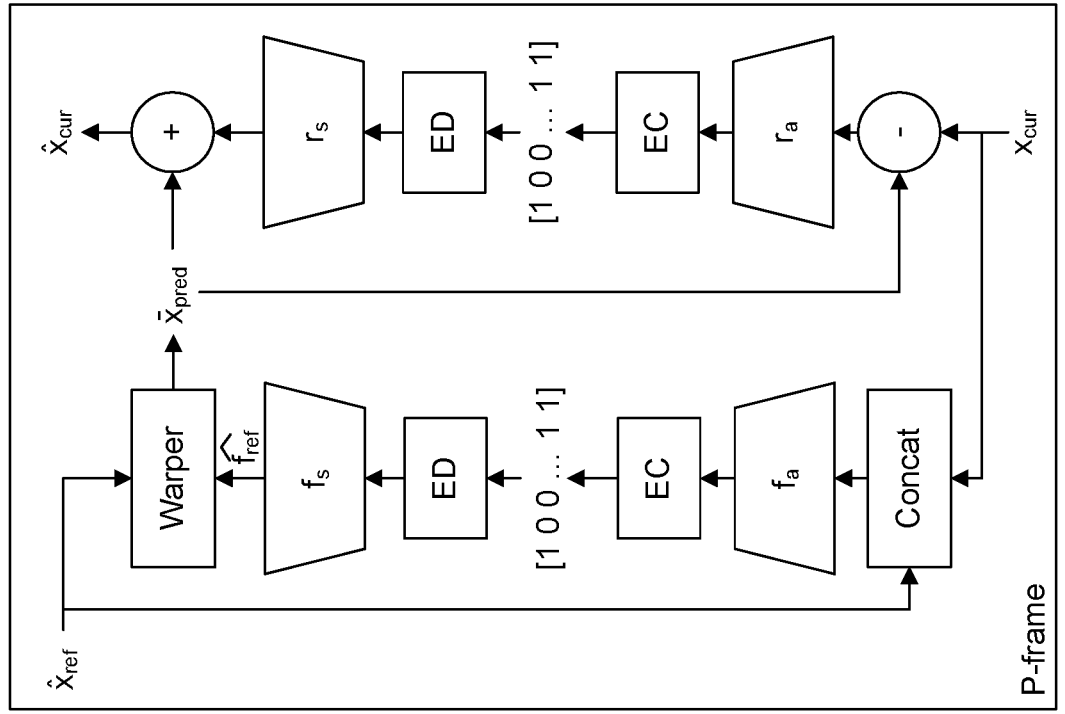
FIG. 3 illustrates an architecture by Agustsson et al. for compressing video frames.
Figure 3:
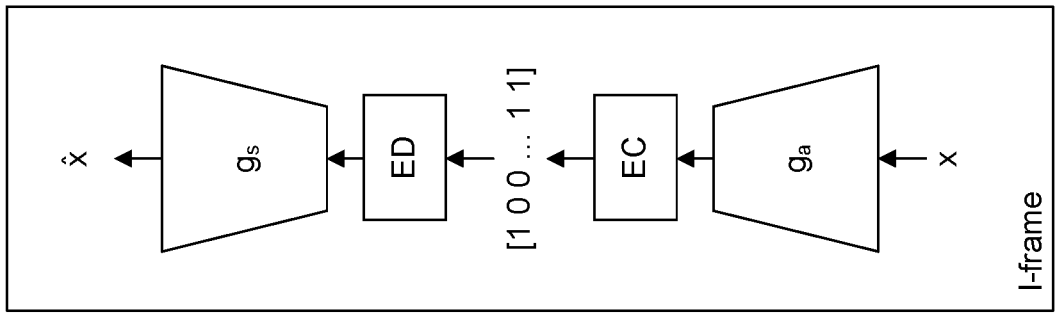

FIG. 3 shows the general architecture presented in a prior approach. The I-frame on the left represents the encoding of key-frames which are independently (Intra) encoded. This block consists of a simple auto-encoder, composed of convolutional analysis and synthesis modules, as developed for ANN-based image compression. At the inference, an Entropy Coder (EC) and an Entropy Decoder (ED) are used to arithmetically remove redundancies.

Predicted frames (P) are encoded following the process on the right. At the encoder, the inputs are the current frame $x_{cur}$ and a previously reconstructed reference frame $\hat{x}_{ref}$. Both images are used to derive and encode the motion information. They are concatenated as a unique tensor which is the input of the motion flow autoencoder ($f_a$, $f_s$) which produces a reconstructed flow $\widehat{f_{ref}}$. The latter is used to warp the reference frame $\hat{x}_{ref}$ onto the current, since the decoder will have access to the reconstructed flow only. This produces a predictor for the current frame $\overline{x}_{pred}$. The residual, corresponding to $x_{cur} - \overline{x}_{pred}$ is then encoded by $(r_a, r_s)$. The reconstructed residual is finally added to the reconstructed prediction to form the decoded image $\hat{x}_{cur}$.

The bitstream, denoted by $[1\ 0\ 0\ \ldots\ 1\ 1]$ in FIG. 3 is then composed of binary codes representing either the latent representation of I-frames, or the latent representations of the motion field and the residuals in the case of predicted frames.

This invention aims at solving the problem of optimizing the compression of videos by using motion compensation based on optical flow estimation and coding. The dependencies that can be modeled between 2 pictures highly depends on the distance in time between the 2 frames. This distance results from 2 main parameters: the number of frames separating the 2 reference frames and the framerate at which the video was acquired.

ANN-based optical flow estimators usually rely on convolutional layers to capture the features related to motions and deformations of the textures between frames. The flow amplitude and accuracy vary dramatically depending on the action in the scene, the camera movements, as well as the above parameters defining a temporal distance between two frames. As such, the design of the convolutional model would need to be able to capture a large variety of displacements for the different temporal coding structures. In this invention, we propose to improve the performance of the joint flow estimation and compression by conditioning the convolutional layers of the optical flow auto-encoder with the distance between the reference frames.

Traditional video coding methods rely on block-based motion estimation as detailed in section 1. This design relies on the assumption the motion between frames can be modeled by a simple translation for each block. The encoder chooses the block partitioning that minimizes the residuals that need to be transmitted to correct the error made by this modeling. For each block to encode, the encoder finds a best matching predictor in a reference picture previously decoded. To capture large motion and be able to estimate the motion between distant frames, traditional codecs define maximum motion vector. Recent works have shown the promises of using deep neural networks for estimating and encoding dense motion flow between frames of videos. However, existing methods usually rely on simple temporal structures such as the simplest possible variant of the low delay structure where each frame only depends on the directly preceding frame in display order. Contrary to the random access presented in an above section, the display and coding order are identical, which solves the problem of the distance between predicted and reference frame, but limits the coding efficiency, since deep-learning-based motion models could also leverage complex bi-directional temporal structures.

In a recent work, a deep motion flow estimation-based framework leveraging bi-directional prediction is proposed. It relies on a recurrent model to keep the state of each frame for the next ones in coding order. However, it does not seem that the approach can scale as the model is learned for the full group of pictures. If another GOP structure needs to be used, the model needs to be adapted and re-retrained.

In this invention, it is proposed to improve video compression based on artificial neural networks by specializing the motion flow estimator, depending on the temporal structure. The overall architecture is similar to the one depicted in FIG. 3 where the reference pictures can be determined by a structure as shown in FIG. 2.

In particular, we propose to use conditional (de)convolutions in the network modules (instead of standard (de) convolutions) to train a generic network able to handle complex GOP structures, with varying distances between reference frames.

Proposed Generic Method

In this document, it is proposed to adapt the model by using conditional convolution that depends on the inter-dependencies in the GOP structure. The following paragraphs describe the context and the design of motion flow estimation and encoding on top of which this invention can be applied.

Autoencoders that are used to encode the motion flow are usually based on convolutional layers which take as input the current and reference frame pixel values. As can be seen in FIG. 3, the frames are concatenated along the component axis to enter the convolutional model $(f_a, \hat{f}_s)$. For instance, if the images are represented in RGB format, they can be shaped as tensors of size 3×h×w where h and w denote the height and width of the frames, respectively. The input to the flow autoencoder then consists of a 6×h×w. Successive convolutional layers lead to a lower dimension and compressible latent representation to be encoded. Typically, the latent is a tensor containing more channels (N>6 in our RGB example), but smaller spatial dimensions, e.g., $$128 \times \left(\frac{h}{16}\right) \times \left(\frac{w}{16}\right).$$

When encoding a video represented in the YUV color format, it is possible to process the YUV content like the RGB, especially when Y, U and V have the same size. It may also be relevant to use the Luma (Y) channel only to derive the motion. In that case, only one component of each input is considered, and the input tensor has the shape 2×h×w. At the decoder, transpose convolutions are used to generate the output which contains the motion information in the form of vectors, i.e., vertical and horizontal motion components, hence a tensor of shape 2×h×w, which will be used to warp the reference picture onto the current frame.

Note that additional components can be estimated, as in the scale-space flow scheme proposed in a prior method where an additional channel is used to identify and blur regions where the motion estimation failed, e.g. when occlusions happened and no matching texture is found in the reference picture. These techniques are compatible with the proposed invention described below.

Such an autoencoder needs to be trained, i.e., the weights of the convolutions and the entropy bottleneck are optimized on a large dataset of videos. As described in previous sections, efficient GOP structures lead to predictions that occur between frames at different distance from each other and in different contexts: past, future content type, etc.

A first trivial way to cope with this issue would be to learn and encode each possible mapping in a given GOP structure. However, that would dramatically increase the size of the overall encoder/decoder models as multiple flow autoencoders would be required. In addition, this would be difficult to scale and adapt when new types or sizes of GOPs are used. For instance, in traditional video coding, thanks to improved motion estimation and coding, random access GOPs considered in standardization now include 16 or 32 frames whereas they only had 8 frames in the past, as shown in FIG. 2.

Another way to solve this would be to learn only one model for different inter-frame prediction contexts. However, this solution leads to a sub-optimal motion flow construction as the same weights are used in different conditions.

Figure 4:
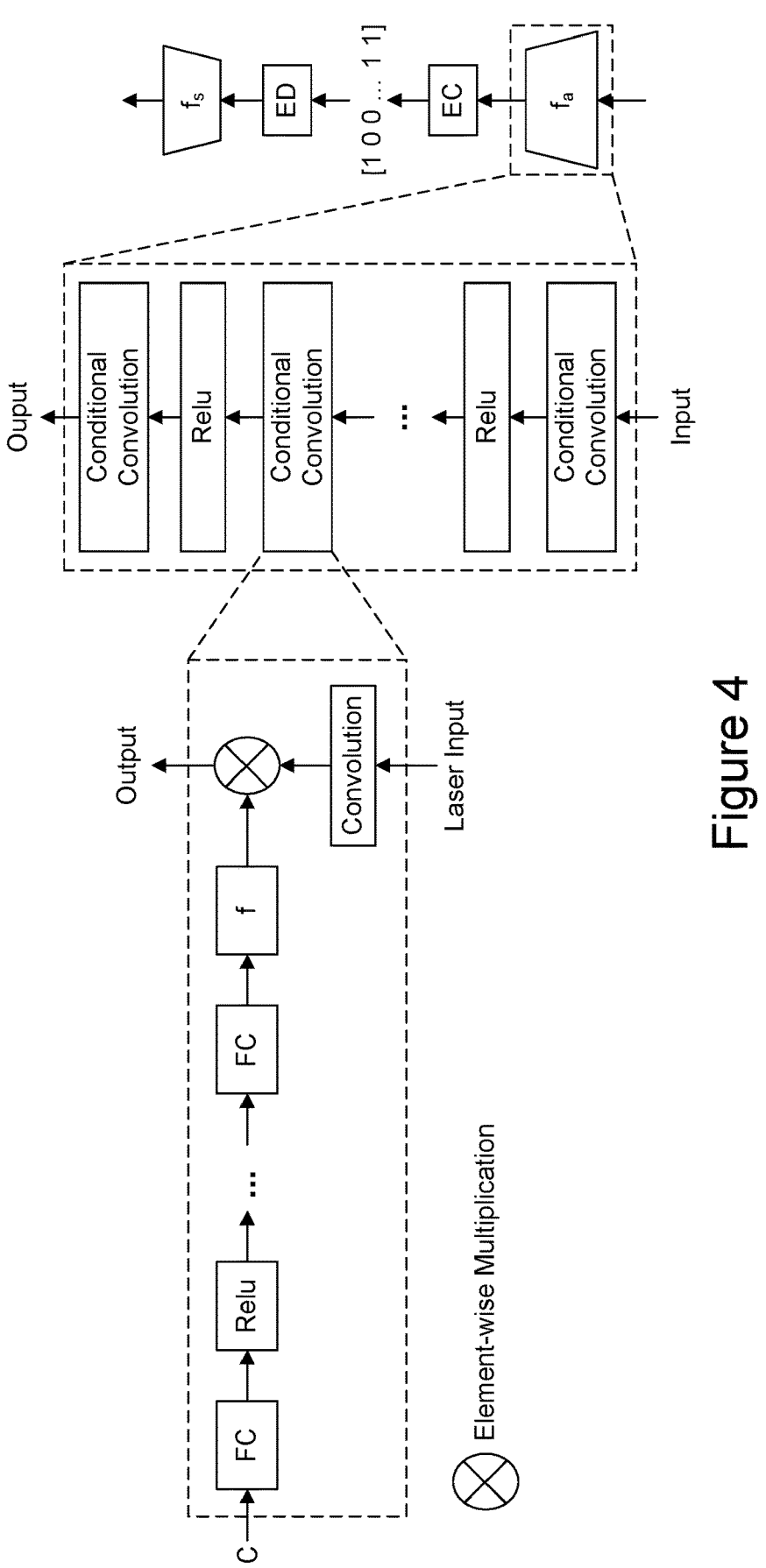
FIG. 4 illustrates a proposed architecture using conditional convolutions.

In this document, it is proposed to adapt the model by using conditional convolution that depends on the inter-dependencies in the GOP structure. FIG. 4 shows the overall architecture. On the right side, the motion flow autoencoder $(f_a, f_s)$ is represented like in FIG. 3. However, the convolutions and deconvolutions used in $f_a$ and $f_s$, respectively, are replaced by conditional convolutions, resp. deconvolutions. A vector coding the current condition c is used as input to a succession of layers, e.g.: fully connected (FC) layers in FIG. 4, which produce a vector of the size corresponding to the number of channels of the output tensor of the convolution. Each channel of the output of the convolution is then multiplied by the corresponding value in the vector output of the small network propagating the condition. The function $f$ can be any scaling function, e.g.: an exponential function.

Note that it is proposed to replace at least one layer. All the convolutions can be replaced for instance, but it can also be envisioned to replace only a couple of layers to find a proper balance between model size and compression efficiency.

In the exemplary FIG. 4, non-linearities of type re/u are represented. This invention is not limited to the use of re/u activation, any type of non-linearity can be considered in between conditional convolutions as well as inside the conditional module.

The condition can be encoded as a one-hot encoding. For example, if we consider 3 possible distances between references, the condition vector will have a length of 3 and the 3 values can be encoded as such: [0, 0, 1], [0, 1, 0], [1, 0, 0]. Although other schemes can be considered, one-hot encoding for conditional modules as proven to be very effective in deep learning applications.

Variants

In this section, we present different variants, examples and embodiments of the proposed method.
Extending the Conditions The first parameter which can be modified in different variant is the actual condition parameter which is the input of the convolutional module. C can either be a single value, e.g.: the distance between the predicted and reference frames, but it can also be a vector containing several parameters. The following conditions can also be considered, separately or in combination:

distance between the current and reference frames,
  whether the reference is in the past or future of the current
    frame in display order,
  how many frames are used to predict the current frame,
  the framerate at which the sequence was shot,
  the type of content: gaming, VR360 content, screen
    content
More Conditional Modules Although the main embodiment of this proposal focuses on conditioning the joint optical flow estimation/compression to different predictions structures because it is the main module that is logically impacted, other parts of the model can be adapted.

For example, residual coding or restoration filters can be used to improve the prediction. These modules can also be conditioned based on 'C', as described above, to learn different behavior based on the current prediction type.
Affine Conditional Functions The main embodiment described the use of a function to modify the outputs of the convolution:

$$Y = f(s(c) \cdot (W * X))$$

with X the input, W the convolution weights, $f$ (also denoted $f$ in FIG. 4) any activation function (e.g.: exponential, softplus), s the scaling set of functions learned on the condition c.

In this variant, it is proposed to include a bias in the computation of the output as:

$$Y = f(s(c) \cdot (W \cdot X)) + b(c)$$

where b(c) is a bias vector which contains as many elements as the number of channels of the output tensor.
Syntax The condition c is derived using the metadata signaling the different elements, e.g., reference and current frame Picture Order Count (POC) which are used to calculate the distance between the frames as well as the prediction temporal direction.

A syntax element can be added to activate the proposed conditional modules.

In addition, some metadata might be required to optimize the encoding. For instance, the framerate of the video can be used to derive c. The framerate is usually barely used in traditional video compression and is not part of the essential High-Level Syntax that is transmitted to the decoder as it does not interfere with the decoding process. In this variant, this metadata should be transmitted if required to derive c.

In another variant, the information c can be transmitted to the decoder as part of the high-level syntax. At sequence or frame/slice level. The encoder can make some decisions depending on the content or the temporal structure and adjust the condition c in accordance. At the decoder, the proper conditional deconvolutions are derived using the transmitted c.

Figure 5:
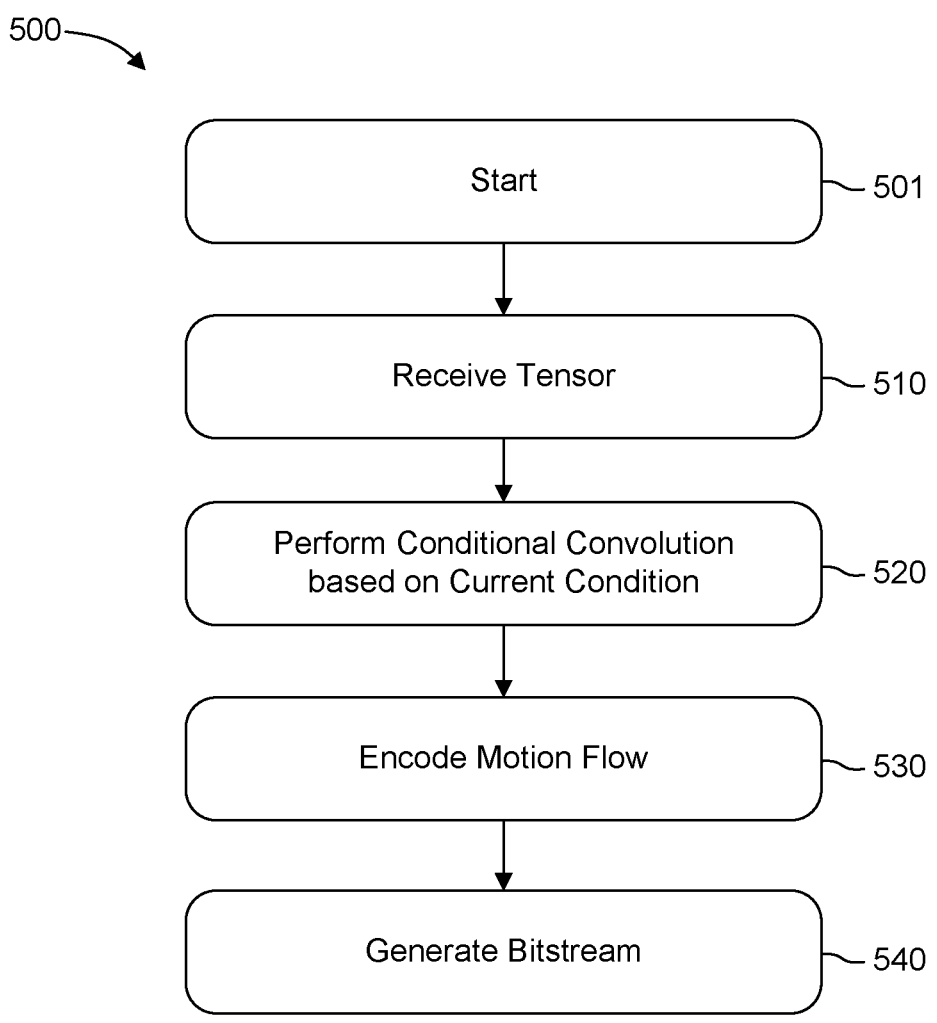
FIG. 5 illustrates one embodiment of a method for encoding video using the present principles.

One embodiment of a method 500 for encoding is shown in FIG. 5. The method commences at Start block 501 and proceeds to block 510 for receiving an input to a conditional convolution layer, said input comprising a concatenated tensor of a current and at least one reference block. Control proceeds from block 510 to block 520 for performing at least one conditional convolution on said input based on data representative of a current condition, said conditional convolution comprising a series of fully connected layers. Control proceeds from block 520 to block 530 for encoding motion flow using an output from the at least one conditional convolution, wherein the current condition is based on GOP structure. Control proceeds from block 530 to block 540 for generating a bitstream comprising said encoded motion flow.

Figure 6:
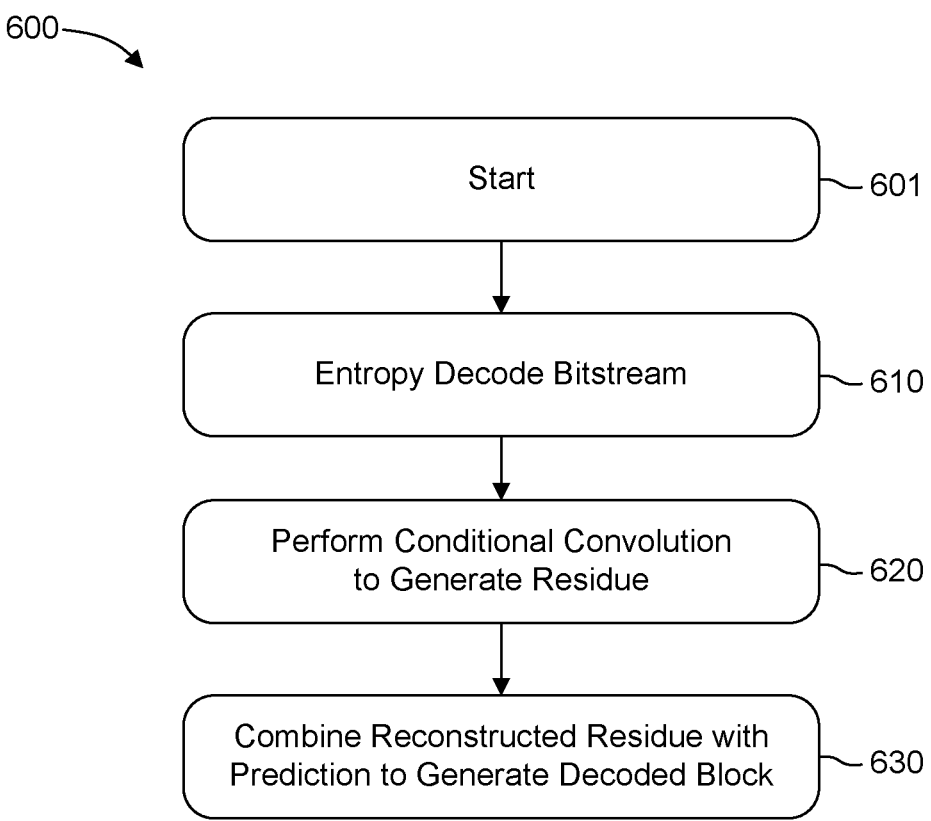
FIG. 6 illustrates one embodiment of a method for decoding video using the present principles.

One embodiment of a method 600 for decoding video data is shown in FIG. 6. The method commences at Start block 601 and proceeds to block 610 for entropy decoding a bitstream comprising motion flow data of a current block of video data. Control proceeds from block 610 to block 620 for performing at least one conditional deconvolution on said bitstream to generate a reconstructed residue, said conditional deconvolution comprising a series of fully connected layers. Control proceeds from block 620 to block 630 for combining said reconstructed residue with a prediction of said current block to generate a decoded block.

Figure 7:
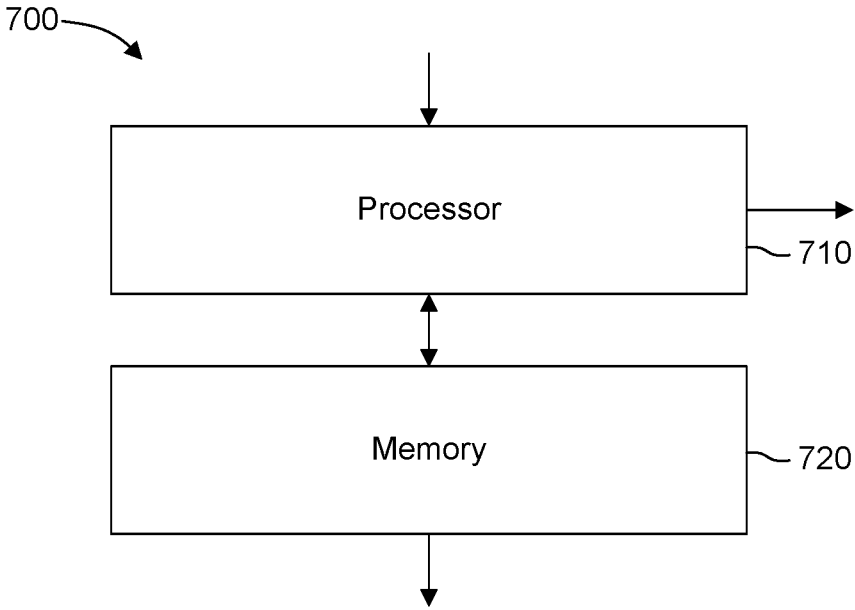
FIG. 7 illustrates one embodiment of an apparatus for encoding or decoding using the present principles.

FIG. 7 shows one embodiment of an apparatus 700 for compressing, encoding or decoding video using the aforementioned methods. The apparatus comprises Processor 710 and can be interconnected to a memory 720 through at least one port. Both Processor 710 and memory 720 can also have one or more additional interconnections to external connections.

Processor 710 is also configured to either insert or receive information in a bitstream and, either compressing, encoding, or decoding using the aforementioned methods.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 8:
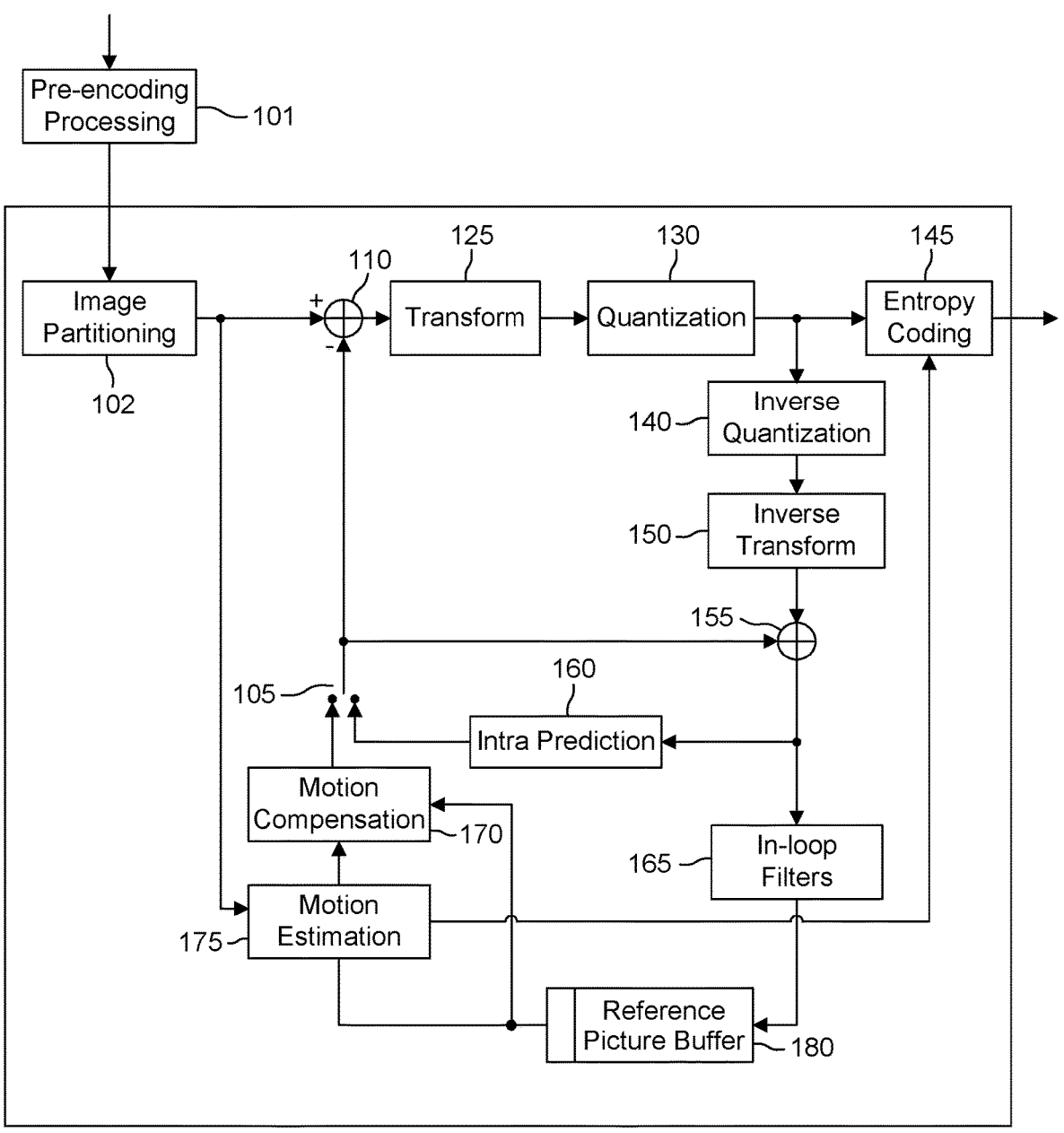
FIG. 8 illustrates a standard, generic video compression scheme.
Figure 9:
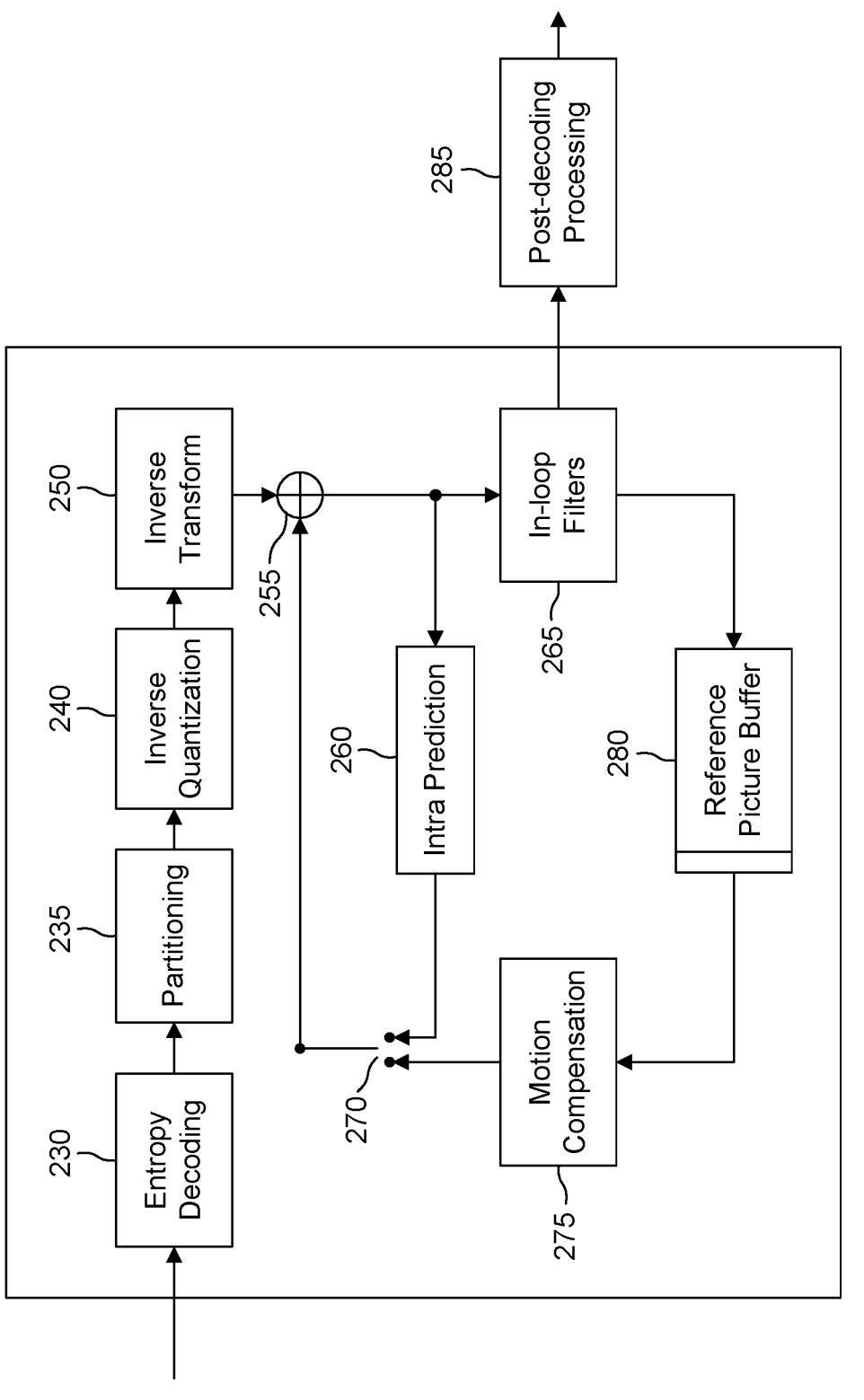
FIG. 9 illustrates a standard, generic video decompression scheme.
Figure 10:
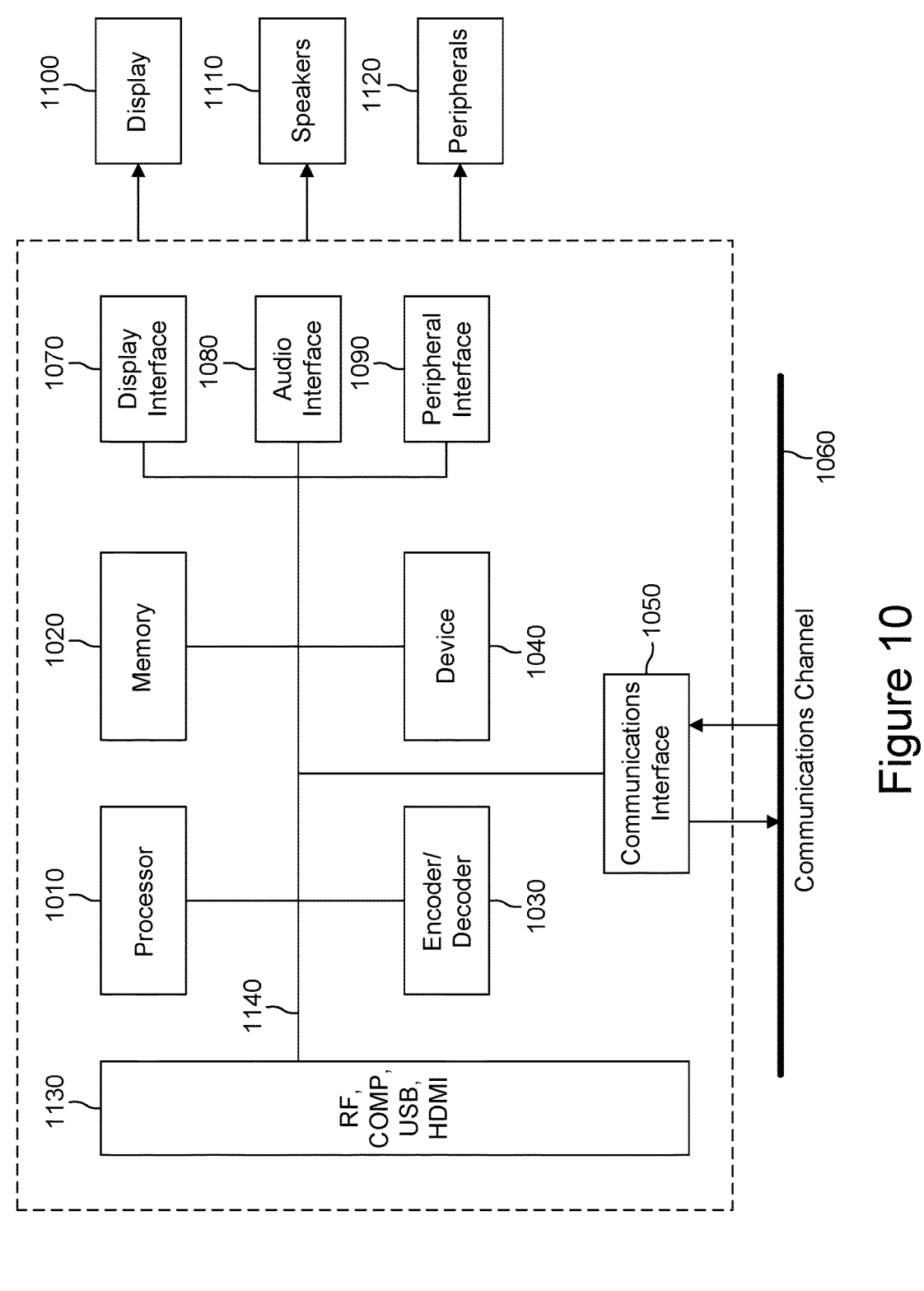
FIG. 10 illustrates a processor based system for encoding/decoding under the general described aspects.

The aspects described and contemplated in this application can be implemented in many different forms. FIGS. 8, 9, and 10 provide some embodiments, but other embodiments are contemplated and the discussion of FIGS. 8, 9, and 10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the intra prediction, entropy coding, and/or decoding modules (160, 360, 145, 330), of a video encoder 100 and decoder 200 as shown in FIG. 8 and FIG. 9. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 8 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 9 illustrates a block diagram of a video decoder 200. In the decoder 200, a bitstream is decoded by the decoder elements as described below. Video decoder 200 generally performs a decoding pass reciprocal to the encoding pass as described in FIG. 8. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g., conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 10 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Encoding and decoding of video information using conditional convolution.

The above encoding and decoding with the conditional coding based on GOP structure.

The above encoding and decoding using luminance to determine motion flow.

The above encoding and decoding implemented with a succession of fully connected layers.

The above encoding and decoding using transpose convolutions to generate motion information.

The above encoding and decoding further comprising warping the reference frame onto a current frame using motion information to produce a predictor for the current frame.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g., using a monitor, screen, or other type of display) a resulting image.

A TV, set-top box, cell phone, tablet, or other electronic device that selects, bandlimits, or tunes (e.g., using a tuner) a channel to receive a signal including an encoded image, and performs transform method(s) according to any of the embodiments described.

A TV, set-top box, cell phone, tablet, or other electronic device that receives (e.g., using an antenna) a signal over the air that includes an encoded image, and performs transform method(s).

The invention claimed is:

1. A method, comprising:
receiving an input to a conditional convolution layer, wherein the input comprises a concatenated tensor of a current block and at least one reference block, and wherein the conditional convolution layer is at least one layer in a series of fully connected convolution layers;
processing at least one conditional convolution on the input, wherein the at least one conditional convolution is processed based at least on data representative of a current condition, and wherein the current condition comprises temporal-structure information associated with a group of pictures (GOP) structure;
encoding motion flow using an output from the at least one conditional convolution; and
generating a bitstream comprising the encoded motion flow.

2. The method of claim 1, wherein the data representative of the current condition that comprises the temporal-structure information associated with the GOP structure indicates at least one of: a framerate, a number of frames separating a first reference frame and a second reference frame, a distance between a current frame and a reference frame, a display order indicating whether the reference frame is before or after the current frame, a number of frames used to predict the current frame, a prediction direction between the current block and the reference block, or a content type.

3. The method of claim 1, wherein the GOP structure comprises a content type, and wherein the content type is at least one of: gaming, VR360 content, or screen content.

4. The method of claim 1, wherein the current condition is indicated by a one-hot encoded vector over a plurality of temporal conditions.

5. The method of claim 1, wherein the method further comprises:

indicating, in the bitstream, the data representative of the current condition that comprises the temporal-structure information associated with the GOP structure.

6. The method of claim 1, further comprising:

determining a scaling set associated with the conditional convolution layer, wherein the scaling set is determined from the data representative of the current condition that comprises the temporal-structure information associated with the GOP structure; and processing the at least one conditional convolution on the input further by applying, via the conditional convolution layer, a weight and the scaling set to the input.

7. The method of claim 6, wherein the data representative of the current condition that comprises the temporal-structure information associated with the GOP structure indicates a framerate and a number of frames separating a first reference frame and a second reference frame, and wherein the scaling set is determined based on the framerate and the number of frames.

8. The method of claim 1, further comprising:

determining a bias vector associated with the conditional convolution layer, wherein the bias vector is determined from the data representative of the current condition that comprises the temporal-structure information associated with the GOP structure; and processing the at least one conditional convolution on the input further by applying, via the conditional convolution layer, a weight and the bias vector to the input.

9. The method of claim 8, wherein the data representative of the current condition that comprises the temporal-structure information associated with the GOP structure indicates a framerate and a number of frames separating a first reference frame and a second reference frame, and wherein the bias vector is determined based on the framerate and the number of frames.

10. An encoding device, comprising:

a processor, configured to:

receive an input to a conditional convolution layer, wherein the input comprises a concatenated tensor of a current block and at least one reference block, and wherein the conditional convolution layer is at least one layer in a series of fully connected convolution layers;

process at least one conditional convolution on the input, wherein the at least one conditional convolution is processed based at least on data representative of a current condition, wherein the current condition comprises temporal-structure information associated with a group of pictures (GOP) structure;

encode motion flow using an output from the at least one conditional convolution; and generate a bitstream comprising the encoded motion flow.

11. A method, comprising:

entropy decoding a bitstream comprising motion flow data associated with a current block;

processing at least one conditional deconvolution on the motion flow data via a conditional deconvolution layer to generate a reconstructed residue, wherein the conditional deconvolution layer is at least one layer in a series of fully connected layers, and wherein the at least one conditional deconvolution is processed based at least on data representative of a current condition, wherein the current condition comprises temporal-structure information associated with a group of pictures (GOP) structure; and decoding the current block based on the reconstructed residue and a prediction of the current block.

12. The method of claim 11, wherein the data representative of the current condition that comprises the temporal-structure information associated with the GOP structure indicates at least one of: a framerate, a number of frames separating a first reference frame and a second reference frame, a distance between a current frame and a reference frame, a display order indicating whether the reference frame is before or after the current frame, a number of frames used to predict the current frame, a prediction direction between the current block and the reference block, or a content type.

13. The method of claim 11, wherein the GOP structure comprises a content type, and wherein the content type is at least one of: gaming, VR360 content, or screen content.

14. The method of claim 11, wherein the current condition is indicated by a one-hot encoded vector over a plurality of temporal conditions.

15. The method of claim 11, wherein the method further comprises:

receiving, in the bitstream, an indication of the data representative of the current condition that comprises the temporal-structure information associated with the GOP structure.

16. The method of claim 11, further comprising:

determining a scaling set associated with the conditional deconvolution layer, wherein the scaling set is determined from the data representative of the current condition that comprises the temporal-structure information associated with the GOP structure; and processing the at least one conditional deconvolution on the motion flow data further by applying, via the conditional deconvolution layer, a weight and the scaling set to the motion flow data.

17. The method of claim 16, wherein the data representative of the current condition that comprises the temporal-structure information associated with the GOP structure indicates a framerate and a number of frames separating a first reference frame and a second reference frame, and wherein the scaling set is determined based on the framerate and the number of frames.

18. The method of claim 11, further comprising:

determining a bias vector associated with the conditional deconvolution layer, wherein the bias vector is determined from the data representative of the current condition that comprises the temporal-structure information associated with the GOP structure; and processing the at least one conditional deconvolution on the motion flow data further by applying, via the conditional deconvolution layer, a weight and the bias vector to the motion flow data.

19. The method of claim 18, wherein the data representative of the current condition that comprises the temporal-structure information associated with the GOP structure indicates a framerate and a number of frames separating a first reference frame and a second reference frame, and wherein the bias vector is determined based on the framerate and the number of frames.

20. A decoding device, comprising:

a processor, configured to:

entropy decode a bitstream comprising motion flow data associated with a current block;

process at least one conditional deconvolution on the motion flow data via a conditional deconvolution layer to generate a reconstructed residue, wherein the conditional deconvolution layer is at least one layer in a series of fully connected layers, and wherein the at least one conditional deconvolution is processed based at least on data representative of a current condition, wherein the current condition comprises temporal-structure information associated with a group of pictures (GOP) structure; and decode the current block based on the reconstructed residue and a prediction of the current block.

\* \* \* \* \*